United States Patent
Jadhav et al.

(10) Patent No.: US 12,083,473 B2
(45) Date of Patent: Sep. 10, 2024

(54) MERCURY REMOVAL BY INJECTION OF REAGENTS IN GAS PHASE

(71) Applicant: CHEVRON U.S.A. INC., San Ramon, CA (US)

(72) Inventors: Raja Ankush Jadhav, Benecia, CA (US); Ryan Owen, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 17/709,598

(22) Filed: Mar. 31, 2022

(65) Prior Publication Data

US 2022/0314162 A1  Oct. 6, 2022

Related U.S. Application Data

(60) Provisional application No. 63/169,775, filed on Apr. 1, 2021.

(51) Int. Cl.
*B01D 53/18* (2006.01)
*B01D 53/14* (2006.01)

(52) U.S. Cl.
CPC ....... *B01D 53/185* (2013.01); *B01D 53/1493* (2013.01); *B01D 2252/2056* (2013.01); *B01D 2257/602* (2013.01)

(58) Field of Classification Search
CPC .. B01D 53/1493; B01D 53/185; B01D 53/64; B01D 53/01
See application file for complete search history.

(56) References Cited

U.S. PATENT DOCUMENTS

| | | | |
|---|---|---|---|
| 10,041,014 B2 | 8/2018 | Thompson et al. | |
| 11,110,393 B2* | 9/2021 | Denny | F23J 15/02 |
| 2014/0072488 A1 | 3/2014 | Cooper et al. | |
| 2017/0158976 A1 | 6/2017 | O'Rear et al. | |
| 2019/0009210 A1 | 1/2019 | Denny et al. | |

FOREIGN PATENT DOCUMENTS

CN  108889110 A  11/2018

OTHER PUBLICATIONS

PCT International Search Report and Written Opinion re PCT International Application PCT/IB2022/052992 mailed Jun. 30, 2022 containing 12 pages.

* cited by examiner

*Primary Examiner* — Sharon Pregler
(74) *Attorney, Agent, or Firm* — Jason M. Guerrero

(57) ABSTRACT

The present invention is directed to the removal of mercury from a gas phase by injecting a scavenger solution into the gas phase.

5 Claims, No Drawings

MERCURY REMOVAL BY INJECTION OF REAGENTS IN GAS PHASE

FIELD OF THE INVENTION

This invention relates to the removal of mercury from a gas phase.

BACKGROUND OF THE INVENTION

Mercury is present in some natural gas streams in significant amounts and needs to be removed because of operational and environmental concerns. Removing bulk elemental mercury as close to the wellhead as possible results in reduced mercury emissions, reduced impact on process equipment and simpler operations. Removal of mercury in a glycol dehydration contractor achieves these benefits in addition to the process intensification as both water and mercury can be removed in the glycol contactor. Mercury absorption in the glycol contactor by injecting a scavenger like sodium polysulfide-Na—PS— at the top of the contactor along with the lean glycol solvent has been previously described in U.S. Pat. No. 10,041,014. Previous studies have suggested that the absorption of mercury in the glycol/Na—PS solution is limited by mass transfer in the gas/liquid phase. Therefore, there is a need to develop a process to improve the absorption of mercury into the glycol solution.

SUMMARY OF THE INVENTION

An embodiment of the invention is a method for increasing the mass transfer between gas phase mercury and scavenger during mercury removal by injecting the scavenger as fine liquid droplets/particles in the gas phase upstream of the contactor.

Another embodiment is injection of the scavenger solution at the well head to increase the contact time for mercury removal in the gas phase.

A further embodiment is the use of a concentrated scavenger solution for injection into the gas phase to reduce the injection rate of the scavenger solution in the gas phase.

DETAILED DESCRIPTION OF THE INVENTION

Described herein is a method for mercury removal from a gas phase by increasing the mass transfer between gas phase mercury and the scavenger, wherein the scavenger is injected into the gas phase upstream of the glycol contactor as fine liquid droplets and/or particles. Injection of the scavenger as fine liquid droplets will increase the surface area for contact with mercury in the gas phase. An embodiment of the invention is the use of a concentrated scavenger solution for injection into the gas phase upstream of the contactor as opposed to at the contactor where the mercury is exposed to a dilute scavenger solution. A net result of these embodiments is a reduction in the injection rate of the scavenger solution in the gas phase.

"Mercury" refers to volatile mercury that is present in the gas phase of well gas or natural gas. Volatile mercury is primarily elemental mercury (Hg0) but may also include some other mercury compounds (organic and inorganic mercury species).

"Wet gas" refers to natural gas that contains less methane (e.g., less than 85%) and more ethane and other more complex hydrocarbons or refers to natural gas that is saturated with water vapor.

"Acid gas" refers to the product gas from an amine unit that contains acidic impurities, e.g., H2S, CO2, SO2 and SO2 (SOx), NO and NO2 (NO2), chlorine, etc. In one embodiment, the acid gas is chemically absorbed in the liquid (solution or fluid). In another embodiment, the acid gas is dissolved in the liquid, e.g., an aqueous amine solution.

The "complexing agent" as used herein refers to a material or compound capable of reacting with volatile mercury in natural gas after absorbing in the glycol solvent, forming a non-volatile mercury complex. Complexing agents include but are not limited to water-soluble sulfur, such as sulfides, hydrosulfides, thiocarbamates, and inorganic polysulfides. Other examples of the complexing agent include mercaptans, organic polysulfides, organic thiocarbamates, thiourea, sulfur-containing polymers, and sulfanes. Acid gases may be present and the complexing agent is still able to functionally remove the volatile mercury and convert to non-volatile mercury.

Examples of complexing agents include but are not limited to water-soluble sulfur species, including but not limited to sulfides, hydrosulfides, and polysulfides, for extracting mercury in natural gas into the aqueous phase as precipitate or soluble mercury sulfur compounds. Examples of water-soluble sulfur compounds include ammonium polysulfide, sodium polysulfide, potassium polysulfide, calcium polysulfide, sodium hydrosulfide, potassium hydrosulfide, ammonium hydrosulfide, sodium sulfide, potassium sulfide, calcium sulfide, magnesium sulfide, ammonium sulfide, sodium thiocarbamate, sodium dithiocarbamate, ammonium thiocarbamate, ammonium dithiocarbamate, and mixtures thereof. Aqueous source containing water-soluble sulfur species can be any of purchased or produced reagent solutions, sulfidic water, sulfidic waste water, kraft caustic liquor, kraft carbonate liquor, etc.

"Oxygen Scavenger" as used herein refers to a compatible compound or solution that does not react with the mercury complexing agent and reduce its effectiveness for mercury capture. Examples of oxygen scavengers that react with a complexing agent such as polysulfide include bisulfites and metabisulfite. In one embodiment, the scavenger is selected for compatibility with the mercury complexing agent. Examples of compatible oxygen scavengers include: hydrazine salts, guanidine salts, N,N-Diethylhydroxylamine, oximes, dithionites, ascorbic acid, and isoascorbic acid. anion salts of these oxygen scavengers can be chlorides, sulfates, and other suitable anions. The cations associated with the oxygen scavengers can be sodium, potassium or volatile cations as described for the complexing agents.

"Mercury Scavenger" as used herein refers to a compound or solution that reacts or complexes with mercury for subsequent removal by absorption, adsorption or filtration to remove it from gas or liquid streams.

Other examples of complexing agents that can be used for the removal of mercury from the glycol unit includes mercaptans, organic polysulfides (compounds of the general formula R-Sx-R' where x is greater than 1 and R and R' are alkyl or aryl groups), organic thiocarbamates, thiourea, sulfur-containing polymers, sulfanes and combinations thereof.

Examples of non-volatile mercury complexes include HgS and soluble mercury-sulfur materials, such as HgSx2-. Volatile mercury refers to mercury in the gas phase and is primarily elemental mercury (Hg0).

Examples of the filter aid used in one embodiment include inorganic polysulfides, sulfides, thiocarbamates, organic polysulfides, metal sulfides, such as Cu(I)2S, Cu(II)S, and MoS, hydrosulfides, and thiol-containing polymers.

Examples of the glycol solvent include triethylene glycol and tetraethylene glycol, containing between 95 and 99.9 wt % of glycol in the lean glycol solvent.

The amount of complexing agents to be added to the glycol solution is determined by the effectiveness of complexing agent employed. The amount is at least equal to the amount of mercury in the gas on a molar basis (1:1), if not in an excess amount. In one embodiment, the molar ratio ranges from 5:1 to 10,000:1. In another embodiment, from 10:1 to 5000:1. In yet another embodiment, a molar ratio of sulfur additive to mercury ranging from 50:1 to 2500:1. In one embodiment with the use of a water-soluble sulfur compound as a scrubbing agent, a sufficient amount of the complexing agent is added to the glycol contactor for a sulfide concentration ranging from 0.05 M to 10M in one embodiment; from 0.1M to 5M in a second embodiment; from 0.3M to 4M in a third embodiment; and at least 0.5M in a fourth embodiment. If the mercury complexing agent is an organic polysulfide, sulfane or mercaptan, the moles of complexing agent are calculated on the same basis as the amount of sulfur present.

An embodiment of the invention is the use of the aforementioned complexing agents and/or scavengers in the form of fine droplets in the gas phase upstream of the contactor. The droplet size may be from 0.2 to 200 micron size. The droplets may be created by employing an ultrasonic, pressure, air or electrostatic atomization technique or combinations thereof. A further embodiment is injection of the complexing agents and/or scavengers at the well head to increase the contact time with the mercury.

Mercury transferred into the scavenger droplets can be removed upstream of the glycol contactor by passing the gas stream through a removal device such as a coalescer, condenser or gas/liquid separator or screen including but not limited to a mist eliminator.

The mercury scavenger may be added to the gas phase upstream of the contactor alone or in combination with glycol, wherein the glycol is 50-95 wt % in the final composition of scavenger, with the balance being the scavenger solution in water. Use of the scavenger in combination with glycol allows for the glycol in the contactor to capture the mercury containing scavenger because the scavenger is already in glycol; wherein, small amounts of glycol build up would be purged. In addition, adding glycol to the scavenger solution increases solubility of mercury in the solution, thus further increasing the mercury scavenging. Glycol mentioned here can be triethylene glycol (TEG) or monoethylene glycol (MEG). Another way to increase solubility of mercury in the scavenger solution is to dilute the sodium polysulfide scavenger stock solution with produced or condensed water, which generally has dissolved hydrocarbons. The amount of produced or condensed water is 50-95 wt % in the final composition of scavenger.

It is expected that elemental mercury in the gas phase would react with the scavenger to transfer to the liquid phase in oxidized form, which is expected to end up in the rich glycol stream in the dehydrator. Mercury in this rich glycol stream can be removed using a suitable adsorbent/resin known to one of skill in the art including but not limited to activated carbon and anion exchange resins.

A further embodiment is the capture of any mercury that is released in the regenerator overhead gas by deploying a mercury removal unit.

In another embodiment of the invention, the droplet size complexing agent is added continuously prior to the liquid contactor. Inside the liquid contactor, the complexing agent dissolved in the lean glycol solvent selectively reacts with the mercury in the natural gas, producing a rich glycol solvent containing mercury. The rich glycol solvent is then sent to an adsorber where mercury and the complexing agent are removed using an adsorbent, such as an activated carbon, ion-exchange resin, alumina, silica, zeolite or supported metal. The rich glycol with reduced complexing agent and no mercury is then fed to the regenerator to remove water in the overhead and regenerate the glycol solvent.

In a further embodiment of the invention the droplet size complexing agent/scavenger is added continuously prior to the liquid contactor. Inside the liquid contactor, the complexing agent dissolved in the lean glycol solvent selectively reacts with the mercury in the natural gas, producing a rich glycol solvent containing mercury. A filter aid is then added after the liquid contactor, but prior to the expansion valve. This filter aid allows for the filtration of the complexing agent with mercury and the filter aid. The filtration may be performed using a 10 mechanical filter, carbon filter, ultrafiltration filter or nanofiltration filter. The rich glycol with reduced complexing agent and no mercury is then fed to the regenerator to remove water in the overhead and regenerate the glycol solvent.

What is claimed is:

1. A method for removing mercury from a natural gas stream by increasing the mass transfer between gas phase mercury present within the natural gas stream and a scavenger during mercury removal, wherein increasing the mass transfer between the gas phase mercury and the scavenger during mercury removal comprises injecting the scavenger as a fine liquid into the natural gas stream upstream of a glycol dehydration contactor.

2. The method of claim 1 wherein the fine liquid is selected from the group consisting of droplets and particles.

3. The method of claim 2 wherein the injection of the scavenger occurs at a well head to increase the contact time for mercury removal in the gas phase.

4. The method of claim 1 wherein the scavenger comprises sodium polysulfide.

5. The method of claim 1, wherein the scavenger comprises a mercury scavenger in a glycol solution.

* * * * *